US008553240B2

(12) United States Patent
Sato

(10) Patent No.: US 8,553,240 B2
(45) Date of Patent: Oct. 8, 2013

(54) PRINTING APPARATUS AND CONTROL METHOD OF THE SAME

(75) Inventor: Hajime Sato, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1356 days.

(21) Appl. No.: 11/697,145

(22) Filed: Apr. 5, 2007

(65) Prior Publication Data

US 2007/0242283 A1 Oct. 18, 2007

(30) Foreign Application Priority Data

Apr. 13, 2006 (JP) ................................ 2006-110697

(51) Int. Cl.
*G06K 15/00* (2006.01)

(52) U.S. Cl.
USPC ........... 358/1.12; 358/1.14; 358/504; 347/19; 347/101; 347/104

(58) Field of Classification Search
USPC ................ 358/1.12, 1.14, 504; 347/19, 101, 347/104
See application file for complete search history.

(56) References Cited

U.S. PATENT DOCUMENTS

| | | | | |
|---|---|---|---|---|
| 7,548,326 | B2 * | 6/2009 | Fukushima | 358/1.12 |
| 2003/0025922 | A1 | 2/2003 | Otsuki | |
| 2004/0212816 | A1 * | 10/2004 | Tanabe et al. | 358/1.9 |

FOREIGN PATENT DOCUMENTS

| | | | |
|---|---|---|---|
| JP | 2003-011345 | A | 1/2003 |

* cited by examiner

*Primary Examiner* — King Poon
*Assistant Examiner* — Lawrence Wills
(74) *Attorney, Agent, or Firm* — Canon USA Inc IP Division

(57) ABSTRACT

In a printing apparatus that stores a sheet conveying distance correction value every sheet kind, the sheet conveying distance correction correcting a sheet conveying distance of a sheet to be printed; detects the sheet kind to be printed; prints a test chart for measuring the sheet conveying distance; determines the sheet conveying distance correction value based on the printed result of the test chart so as to store the sheet conveying distance correction value in a sheet conveying distance correction value storing unit; and conveys a sheet during printing in accordance with the sheet kind detected by a sheet kind detecting unit on the basis of the sheet conveying distance correction value obtained from the correction value storing unit, when the sheet conveying distance correction value for the sheet kind to be printed is not determined, the printing is temporarily interrupted.

15 Claims, 6 Drawing Sheets

EEPROM 2

| SHEET KIND INFORMATION (23) | SHEET CONVEYING DISTANCE CORRECTION (21) | CORRECTION EXECUTION INFORMATION (22) |
|---|---|---|
| PLAIN PAPER | +3 | EXECUTED |
| COATED PAPER | −2 | EXECUTED |
| GLOSSY PAPER | ±0 | UNEXECUTED |

⋮

| CORRECTION EXECUTION SHEET KIND INFORMATION (24) | SHEET CONVEYING DISTANCE SECOND CORRECTION (25) |
|---|---|
| PLAIN PAPER | +3 |

PRINTING APPARATUS AND CONTROL METHOD OF THE SAME

BACKGROUND OF THE INVENTION

1. Field of the Invention

The present invention relates to a printing apparatus for printing by ejecting ink from an ink head and having a correcting unit for correcting sheet feed accuracies.

2. Description of the Related Art

In a conventional printing apparatus for printing by ejecting ink from the ink head, while the ink head is being moved in a main scanning direction, ink is ejected from the ink head and a sheet is conveyed by a predetermined unit distance in a sub scanning direction, so that the sheet is printed by further repeating the ink ejection.

In the sheet conveying, if the predetermined unit distance cannot be maintained every sheet conveying, the image overlapping (black streak) and the image spacing (white streak) are produced, so that printed image quality cannot be maintained.

Therefore, in the conventional printing apparatus, a method for maintaining the printed image quality has been known as follows. The error in sheet conveying is stored in a storing unit as a correction value, and the correction value is added to the sheet conveying distance so as to have a new conveying distance. Then, the sheet is conveyed by the new conveying distance so as to maintain the conveying accuracy.

For example, a conventional printing apparatus has been known as follows. First, a test pattern is printed so as to determine the sheet conveying distance correction value for storing it. Then, the conveying correction value is added to the sheet conveying distance so as to have a new sheet conveying distance. In the printing apparatus, the sheet is conveyed in accordance with the obtained sheet conveying distance so as to correct sheet conveying accuracies (Japanese Patent Laid-Open No. 2003-11345, for example).

The sheet conveying distance accuracies largely differ depending on the sheet kind and factors such as a frictional coefficient.

Hence, there has been known a method for switching a conveying correction value to be added to a conveying distance every sheet kind used for printing, each sheet kind having its correction value stored in a printing apparatus using the conveying correction value.

However, in the method disclosed in Japanese Patent Laid-Open No. 2003-11345 for storing the conveying correction value, when the conveying correction value is stored every sheet kind, the sheet kind cannot be determined whether it is corrected or uncorrected.

Thus, during printing, the sheet kind to be printed cannot be determined whether it is corrected or uncorrected, resulting in being printed without correction so as not to maintain the printed image quality.

SUMMARY OF THE INVENTION

The present invention provides a printing apparatus capable of suppressing the printing that cannot maintain printed image quality when the sheet conveying distance correction value of the sheet kind to be printed is not determined, and a control method of the printing apparatus.

Further features of the present invention will become apparent from the following description of exemplary embodiments with reference to the attached drawings.

DESCRIPTION OF THE EMBODIMENTS

Exemplary embodiments, features and aspects of the present invention will now herein be described.

Figures 1, 2:
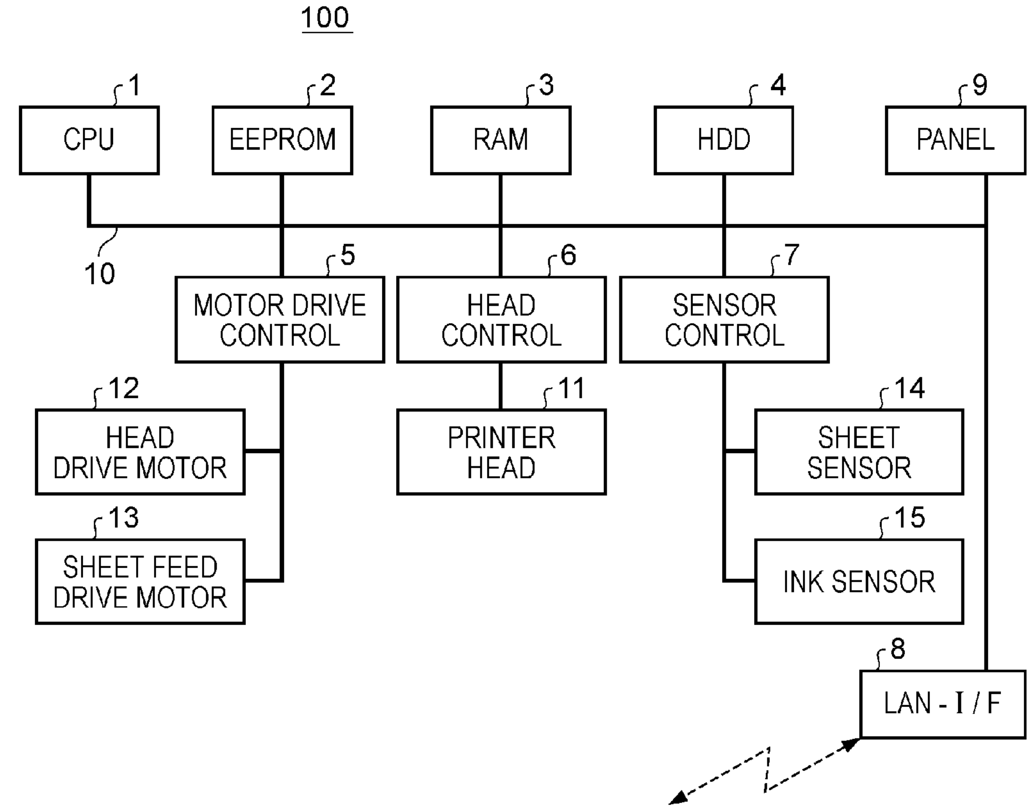
FIG. 1 is a block diagram of an example printing apparatus according to a first embodiment of the present invention.
FIG. 2 is a drawing showing example data, such as sheet conveying distance correction value and correction execution information, stored in an EEPROM 2.

FIG. 1 is a block diagram of an example printing apparatus 100 according to a first embodiment of the present invention.

The printing apparatus 100 includes a CPU 1, an EEPROM (electrically erasable programmable read only memory) 2, an RAM (random access memory) 3, an HDD (hard disk drive) 4, a motor control unit 5, a printing head control unit 6, a sensor control unit 7, and a network interface (network I/F) 8. The printing apparatus 100 also includes a liquid crystal operation panel unit 9, a bus 10, a printer head 11, a head drive motor 12, a sheet feed drive motor 13, a sheet sensor 14, and an ink sensor 15. The CPU 1 controls the entire operation of the printing apparatus 100. The EEPROM 2 stores a program controlling the operation of the printing apparatus 100, a sheet conveying distance correction value, and correction execution information. The RAM 3 temporarily stores various data of the printing apparatus 100 so as to write and read them.

The HDD 4 writes and reads the printing image data of the printing apparatus 100. The motor control unit 5 controls the drive of a sheet feed motor using the conveying correction value of the printing apparatus 100. To the motor control unit 5, a head drive motor 12 for driving (reciprocating) a printer head 11 and the sheet feed motor 13 for feeding a sheet are connected.

The printing head control unit 6 instructs the printer head 11 to eject ink. To the printing head control unit 6, the printer head 11 for ejecting ink on a sheet is connected.

The sensor control unit 7 puts pieces of information obtained from various sensors together. To the sensor control unit 7, the sheet sensor 14 for detecting the presence of a sheet and the number of sheets and the ink sensor 15 for detecting the residual amount of the ink ejected from the printer head 11 are connected.

The network I/F 8 receives printing data transmitted from a host connected to a network. The liquid crystal operation panel unit 9 includes a message display unit and an operation input unit for inputting the instruction from a user by key entry so as to display designations, states, and operation instructions of the printing apparatus 100 for the user. These units 1 to 9 pass and receive data to and fro each other via the bus 10.

Next, an example conveying correction procedure and the printing procedure in the printing apparatus 100 will be described.

FIG. 2 is a drawing showing data, such as a sheet conveying distance correction value and correction execution information, stored in the EEPROM 2.

In the printing apparatus 100, as shown in FIG. 2, a sheet conveying distance correction value 21, correction execution information 22, sheet kind information 23, correction execution sheet kind information 24, and a sheet conveying distance second correction value 25 are stored in the EEPROM 2.

The sheet conveying distance correction value 21 and the correction execution information 22 are stored every piece of the sheet kind information 23 by combining together, and they exist to the number of pieces of the sheet kind information 23 capable of being printed by the printing apparatus 100.

In the sheet conveying distance correction value 21, during conveying the sheet in the sheet kind information 23, the sheet conveying distance difference between the predetermined distance and the excessive distance is stored in μm. When the sheet conveying distance correction value is executed, the sheet conveying distance correction value is stored by writing the new correction value over the old one.

In the sheet conveying distance correction value 21, an ideal sheet conveying distance correction value under a standard circumstance is stored as an initial value in advance. The correction execution information 22 shows the sheet kind information 23 that whether the sheet conveying distance correction is executed, and its initial value is stored "unexecuted". The correction execution sheet kind information 24 and the sheet conveying distance second correction value 25 are stored in one-to-one combination.

In the correction execution sheet kind information 24, the sheet kind information 23 included during execution of the sheet conveying distance correction is stored, and its initial value is stored "unknown". In the sheet conveying distance second correction value 25, the sheet conveying distance correction value 21 obtained by executing the sheet conveying distance correction is stored, and its initial value is stored "0".

Then, the sheet conveying distance correction processing according to the first embodiment will be described.

Figure 3:
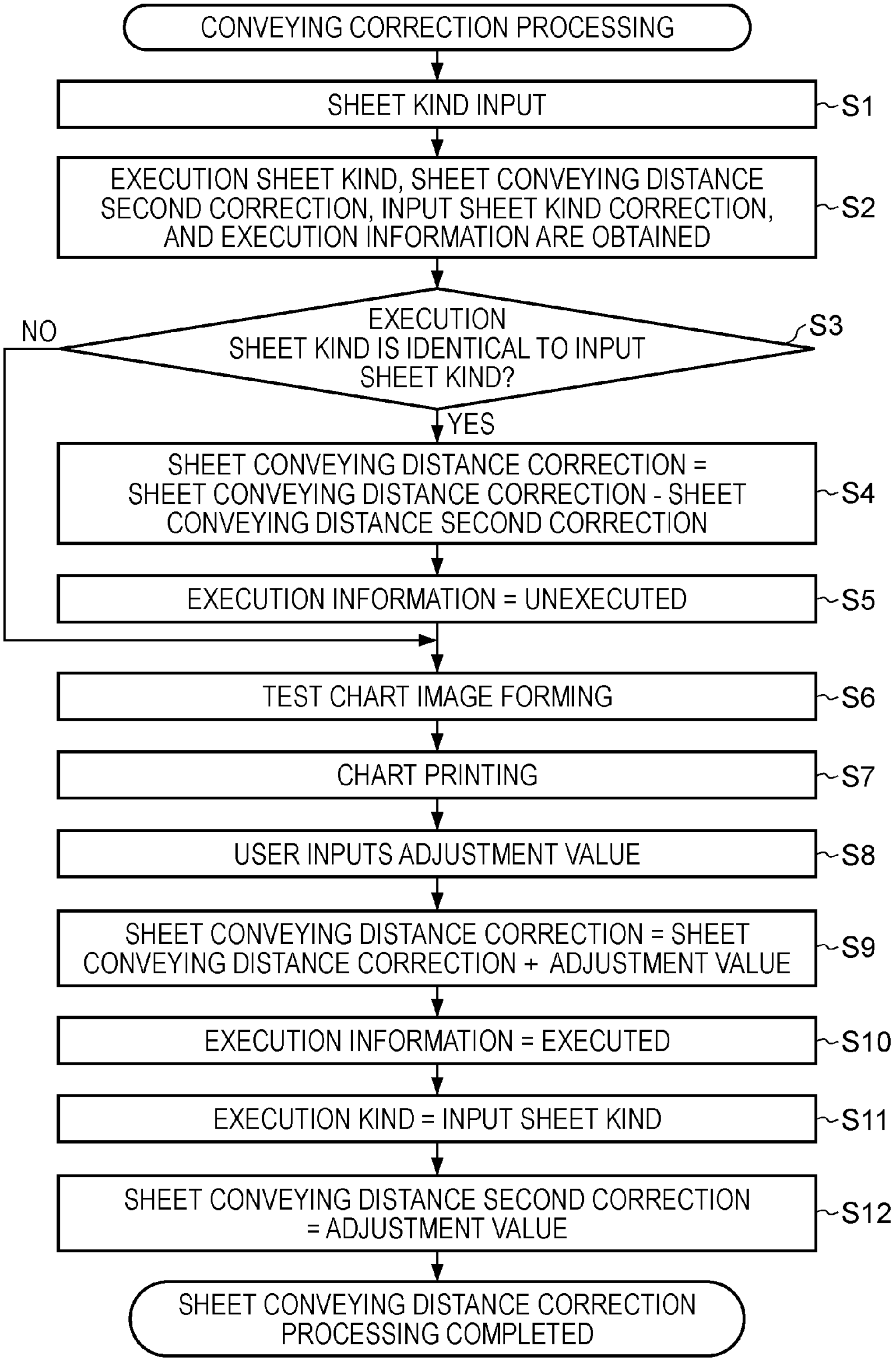
FIG. 3 is a flowchart of an example operation of the printing apparatus.

FIG. 3 is a flowchart of example sheet conveying distance correction processing according to the first embodiment.

Upon instruction of executing the sheet conveying distance correction from the liquid crystal operation panel unit 9 operated by a user, at S1, the sheet kind information 23 is waited for the inputting by the user.

At S2, the sheet conveying distance correction value 21, the correction execution information 22, the correction execution sheet kind information 24, and the sheet conveying distance second correction value 25, which are corresponding to the sheet kind information 23 inputted at S1, are obtained from the EEPROM 2.

At S3, if the correction execution sheet kind information 24 obtained at S2 does not agree with the sheet kind information 23 inputted at S1, the process proceeds to S6, and if it does, the process proceeds to S4.

At S4, the value obtained by subtracting the sheet conveying distance second correction value 25 from the sheet conveying distance correction value 21 obtained at S2 is stored in the EEPROM 2 as a new sheet conveying distance correction value 21.

At S5, "unexecuted" is stored in the EEPROM 2 as the correction execution information 22 obtained at S2. At S6, test chart images in the sheet kind information 23 inputted at S1 are formed on the RAM 3 and printed at S7. During the printing, the sheet is conveyed on the basis of the sheet conveying distance correction value 21 in the same way as in usual printing which will be described later.

At S8, the process waits the inputting an adjustment value from the liquid crystal operation panel unit 9 operated by the user based on the test chart printing result printed at S7. At S9, the value obtained by adding the adjustment value inputted at S8 to the sheet conveying distance correction value 21 corresponding to the sheet kind information 23 inputted at S1 is stored in the EEPROM 2 as a new sheet conveying distance correction value 21.

At S10, "executed" is stored in the EEPROM 2 as the correction execution information 22 corresponding to the sheet kind information 23 inputted at S1. At S11, the sheet kind information 23 inputted at S1 is stored in the EEPROM 2 as the correction execution sheet kind information 24. At S12, the adjustment value inputted at S8 is stored in the EEPROM 2 as the sheet conveying distance second correction value 25 so as to complete the processing.

Figure 4:
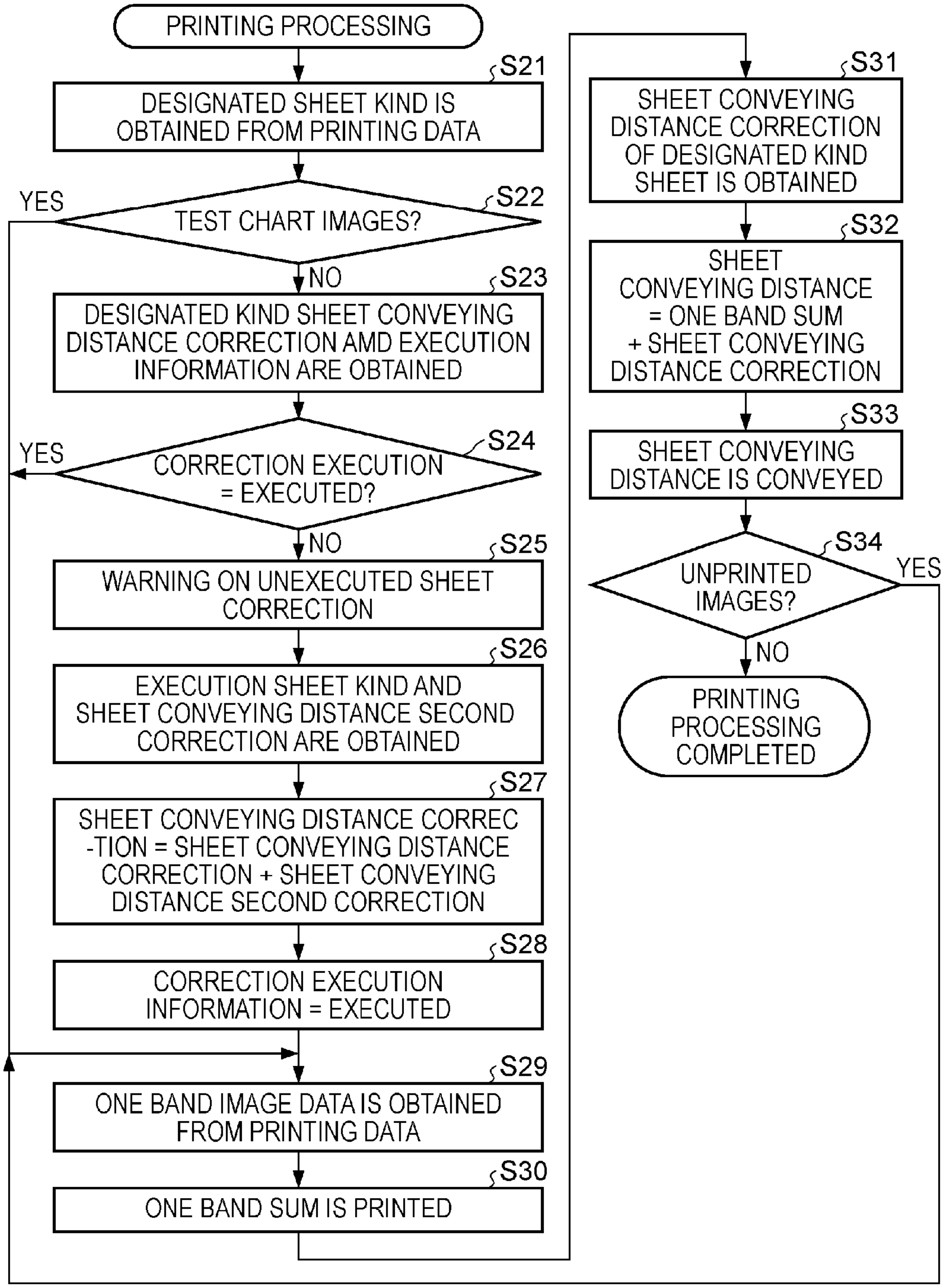
FIG. 4 is a flowchart of an example printing processing according to the first embodiment.
Figure 5:
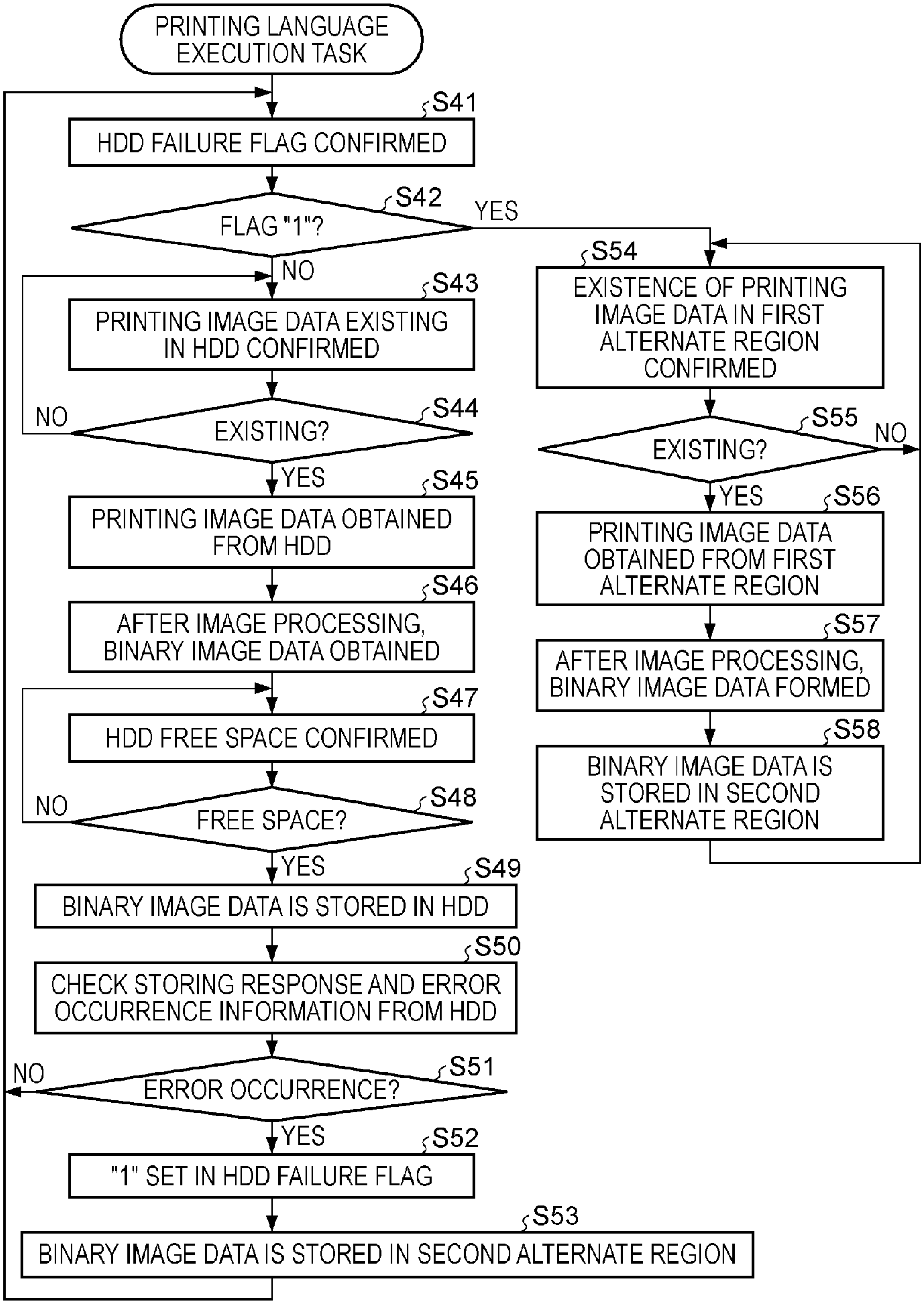
FIG. 5 is a flowchart of an example printing language execution task operation according to the first embodiment.

FIG. 4 is a flowchart of example printing processing according to the first embodiment.

Upon instruction of printing, the sheet kind information 23 designated in printing image data stored on the RAM 3 is obtained at S21. At S22, the printing image data stored on the RAM 3 are determined whether they are test pattern images, and if they are, the process proceeds to S29. If they are not the test pattern images, at S23, the sheet conveying distance correction value 21 and the correction execution information 22, which are corresponding to the sheet kind information 23 obtained at S21, are obtained from the EEPROM 2.

At S24, if the correction execution information 22 obtained at S23 is "executed", the process proceeds to S29. If it is "unexecuted", the process proceeds to S25. At S25, the warning "sheet correction unexecuted" is displayed on the liquid crystal operation panel unit 9 for a user, and the process proceeds to S26 after the inputting by the user is confirmed.

At S26, the correction execution sheet kind information 24 and the sheet conveying distance second correction value 25 are obtained from the EEPROM 2. At S27, the value obtained by adding the sheet conveying distance second correction value 25 to the sheet conveying distance correction value 21 obtained at S23 is stored in the EEPROM 2 as a new sheet conveying distance correction value 21. Furthermore, at S28, the correction execution information 22 obtained at S23 is changed to "executed" and stored in the EEPROM 2, and the process proceeds to S29.

At S29, the image data for one main scan of the printer head 11 are obtained from the printing image data stored on the RAM 3. The printer head 11 herein is a color printer head having a nozzle train ejecting ink for a plurality of colors. When the image data are recorded, the head drive motor 12 drives (moves) the printer head 11 in a direction perpendicular to the nozzle train. The "main scan of the printer head 11" is directed in the nozzle train direction. Furthermore, "the image data for one main scan of the printer head 11" means image data capable of recording along the length of the nozzle train when the printer head 11 moves in one direction at a time.

At S30, the printing for one main scan is executed by ejecting ink from the printer head 11 based on the image data for one main scan while driving the head drive motor 12 in the main scanning direction. At S31, the sheet conveying distance correction value 21 corresponding to the sheet kind information 23 obtained at S21 is obtained.

At S32, the value obtained by adding the sheet conveying distance correction value 21 obtained at S31 to the main scan width of the printer head 11 (one band) is calculated as a corrected sheet conveying distance. At S33, the sheet feed drive motor 13 is driven by the calculated sheet conveying distance so as to convey the sheet.

At S34, the image data stored on the RAM 3 are determined whether unprinted data exist, and if the unprinted data exists, the process returns to S29 for repeating the process at S29. If the unprinted data does not exist, the printing is completed.

Language execution task operation according to the first embodiment.

At S41, an HDD failure flag is confirmed. At S42, the flag is determined whether it is "1". If it is, the process proceeds to S54 while if it is not, the process proceeds to S43.

At S43, the existence of the printing image data in the HDD is confirmed; at S44, the existence is determined; if it is "YES", the process proceeds to S45; if it is "NO", the process returns to S43. At S45, the printing image data are obtained from the HDD; at S46, binary image data are formed after image processing; at S47, a free space of the HDD is confirmed; if it is "YES" at S48, the process proceeds to S49; if it is "NO" at S48, the process returns to S47. At S49, the binary image data is stored in the HDD; at S50, the storing response and the error occurrence information is checked from the HDD. At S51, the error is determined whether it occurs; if it is "YES", the process proceeds to S52; if it is "NO", the process returns to S41. At S52, "1" is set in the HDD failure flag; at S53, the binary image data are stored in a second alternate region; then, the process returns to S41.

If at S42, the flag is determined to be a "1", the process proceeds to S54 where the existence of the printing image data in a first alternate region is confirmed. At S55, the existence is determined; if it is "YES", the process proceeds to S56; if it is "NO", the process returns to S54.

At S56, the printing image data is obtained from the first alternate region; at S57, the binary image data is formed after image processing; at S58, the binary image data are stored in the second alternate region; and then, the process returns to S54.

Figure 6:
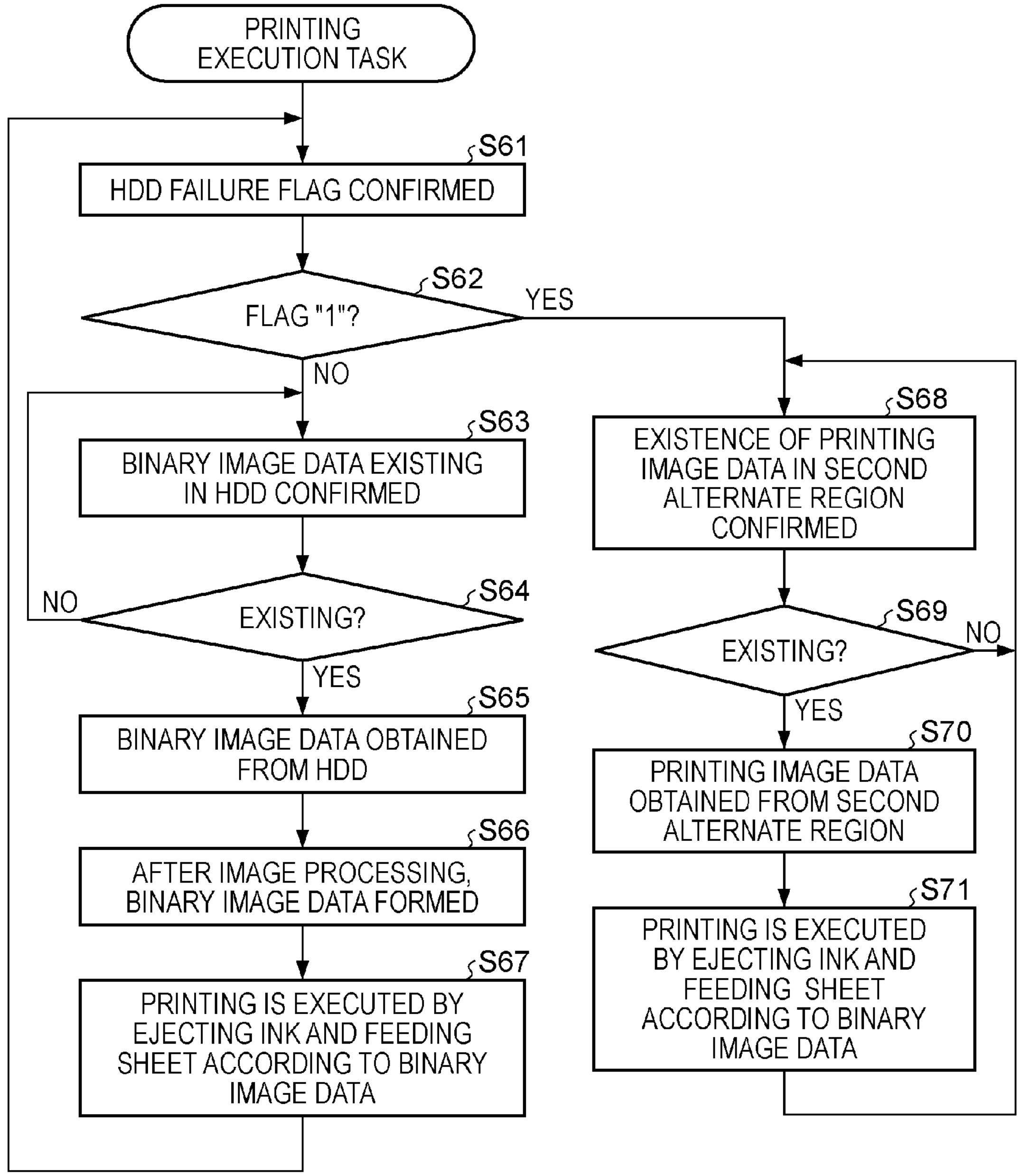
FIG. 6 is a flowchart of an example printing execution task operation according to the first embodiment.

FIG. 6 is a flowchart of an example printing execution task operation according to the first embodiment.

At S61, the HDD failure flag is confirmed; at S62, the flag is determined whether it is "1"; if it is "YES", the process proceeds to S68; if it is "NO", the process proceeds to S63. At S63, the existence of the binary image data in the HDD is confirmed; at S64, the existence is determined; if it is "YES", the process proceeds to S65; if it is "NO", the process returns to S63.

At S65, the binary image data is obtained from the HDD; at S66, the binary image data are produced after image processing; at S67, ink ejection and sheet conveying are performed for printing according to the binary image data.

If at S62, the flag is determined to be "1", the process proceeds to S68. At S68, the existence of the printing image data in the second alternate region is confirmed. At S69, the existence of the printing image data in the second alternate region is determined; if it is "YES", the process proceeds to S70; if it is "NO", the process returns to S68.

At S70, the printing image data is obtained from the second alternate region; at S71, the ink ejection and the sheet conveying are performed for printing according to the binary image data.

Figure 7:
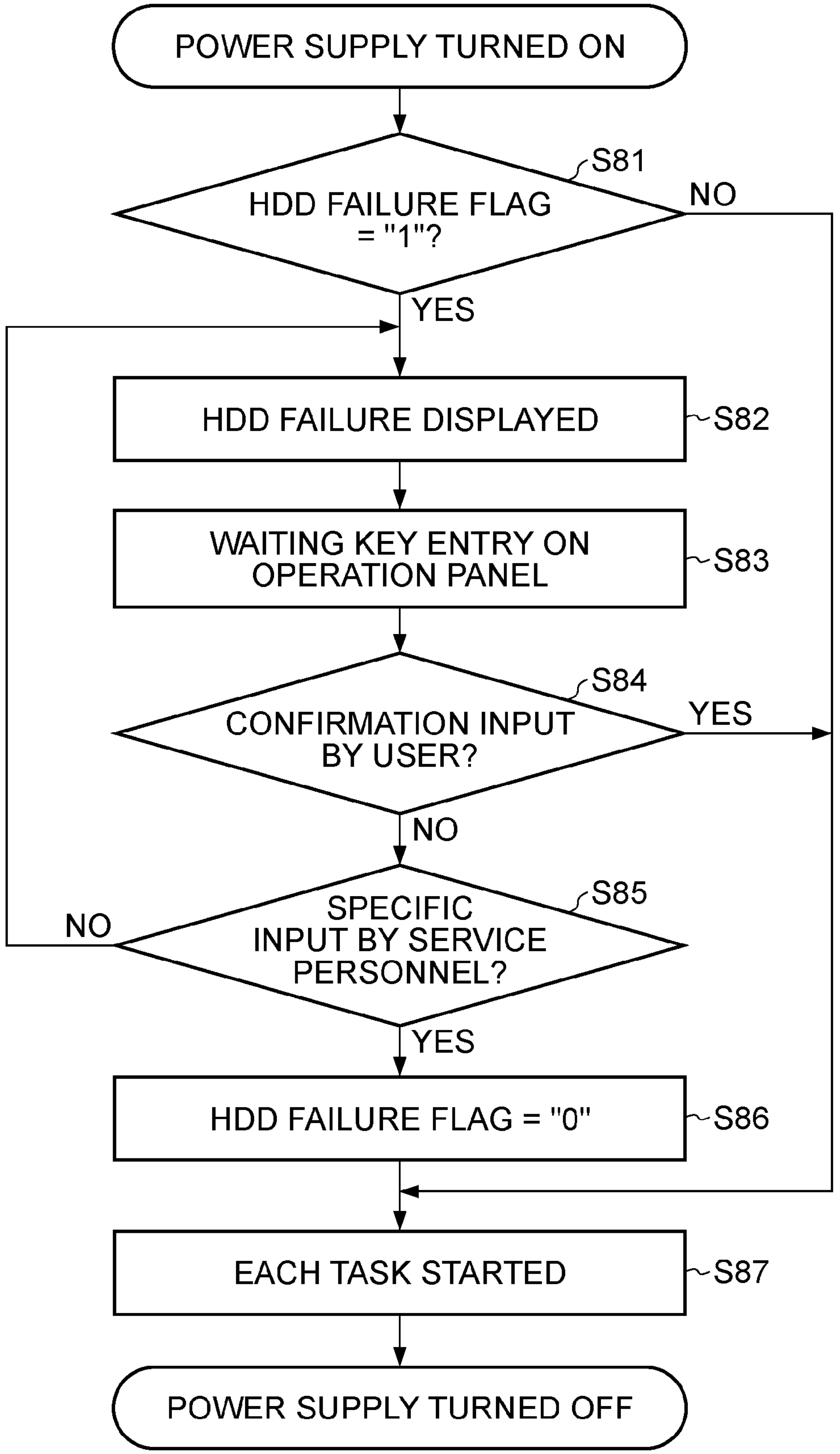
FIG. 7 is an example flowchart of the power supply turning on operation according to the first embodiment.

FIG. 7 is a flowchart of an example power supply turning on operation according to the first embodiment.

At S81, the HDD failure flag is determined whether it is "1"; if it is "YES", the process proceeds to S82; if it is "NO", the process proceeds to S87. At S82, the HDD failure is displayed; at S83, the key entry on the operation panel is awaited for; at S84, the presence of the user confirmation entry is determined; if it is "YES", the process proceeds to S87; if it is "NO", the process proceeds to S85.

At S85, the presence of the specific input by a service personnel is determined; if it is "YES", the process proceeds to S86; if it is "NO", the process returns to S82. At S86, the HDD failure flag is set at "0"; and at S87, each task is activated.

According to the embodiment described above, when the correction execution information of the sheet kind to be printed during printing is unexecuted, the printing is temporarily interrupted, so that the printing incapable of maintaining printed image quality can be suppressed.

Also, according to the embodiment described above, the printing apparatus 100 includes the operation display panel unit, so that the printing processing control unit prompts a user to execute the correction during printing by displaying a warning on the operation display panel unit, securing the printed image quality.

Furthermore, according to the embodiment described above, there are provided the correction execution sheet kind information storing unit for storing the sheet kind with the executed sheet conveying adjustment and the execution correction value storing unit for storing the sheet conveying distance correction value. According to the embodiment, there is also provided the correction calculating unit for calculating the sheet conveying distance correction value of a specific sheet kind from the correction execution sheet kind information and the execution correction, so that the sheet conveying distance correction value of the sheet kind uncorrected by the correction execution information is calculated by the correction calculating unit. Accordingly, according to the embodiment, even when a user uses the sheet kind for printing without sheet conveying distance correction, the printed image quality can be maintained.

Additionally, according to the embodiment, when the correction execution information of the sheet kind to be printed is not corrected, the printing is temporarily interrupted, so that the printing incapable of maintaining printed image quality can be suppressed.

During printing, the printing processing control unit prompts a user to execute the correction by displaying the warning on the operation display panel unit, securing the printed image quality.

Furthermore, according to the embodiment, for a sheet kind uncorrected in the sheet conveying distance, the sheet conveying distance correction value is calculated with a correcting calculating unit. Accordingly, according to the embodiment, even when a user uses the sheet kind for printing without sheet conveying distance correction, the printed image quality can be maintained.

According to the embodiment, when the sheet conveying distance correction value is inputted, a user inputs it via the liquid crystal operation panel unit 9; alternatively, the printed test chart may be read with an optical sensor. Such a manner may have the same effect as above.

According to the embodiment, when the sheet conveying distance is calculated, the correction value is simply added or deducted; alternatively, the sheet conveying distance may be calculated every sheet kind information 23 with each calculation formula. Such a manner may have the same effect as above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-110697 filed Apr. 13, 2006, which is hereby incorporated by reference herein in its entirety.

What is claimed:

1. A printing apparatus comprising:

a correction unit configured to correct a sheet conveying distance for every sheet kind, the correction unit correcting a sheet conveying distance of a sheet to be used for printing according to an adjustment value based a test chart printed by the printing apparatus;

a storing unit configured to store correction execution information which indicates whether the correcting of the sheet conveying distance by the correction unit is executed for every sheet kind;

an accepting unit configured to accept print data different from the test chart;

a determining unit configured to determine, in a case where the print data different from the test chart is accepted by the accepting unit, whether the correcting of the sheet conveying distance by the correction unit for a sheet kind used in printing of the print data different from the test chart and accepted by the accepting unit has been executed based on the correction execution information stored by the storing unit; and a notifying unit configured to notify a user, in a case where the determining unit determines that no correction of the sheet conveying distance for the sheet kind has been executed, that the correcting of the sheet conveying distance has not been executed even though the print data has been accepted by the accepting unit, wherein the printing apparatus inhibits printing of the print data different from the test chart and accepted by the accepting unit until a user input is input in response to the notifying by the notifying unit.

2. The apparatus according to claim 1, further comprising an operation display panel unit, wherein the notifying unit notifies the user that the correcting of the sheet conveying distance has not been corrected by displaying a warning on the operation display panel unit.

3. The apparatus according to claim 1, wherein the printing apparatus inhibits printing of print data accepted by the accepting unit until completion of the correcting of the sheet conveying distance of the sheet kind has been executed by the correction unit.

4. The apparatus according to claim 1, further comprising an inputting unit for inputting an adjustment value by a user, wherein the correction unit corrects the sheet conveying distance based on the adjustment value input by the input unit.

5. The apparatus according to claim 1, further comprising a detecting unit for detecting an adjustment value with an optical sensor, wherein the correction unit corrects the sheet conveying distance based on the adjustment value detected by the detecting unit.

6. A control method of a printing apparatus, the method comprising:

correcting a sheet conveying distance, for every sheet kind, of a sheet to be used for printing by the printing apparatus according to an adjustment value based on a test chart printed by the printing apparatus;

storing correction execution information which indicates whether the correcting of the sheet conveying distance by the correction unit is executed for every sheet kind;

accepting print data different form the test chart;

determining, in a case where the print data different form the test chart is accepted in the accepting step, whether the correcting of the sheet conveying distance in the correcting step for a sheet kind used in printing of the print data different form the test chart and accepted in the accepting step has been executed based on the correction execution information stored in the storing step;

notifying a user, in a case where it is determined in the determining step that no correction of the sheet conveying distance for the sheet kind has been executed, that the correcting of the sheet conveying distance has not been executed even though the print data has been accepted in the accepting step; and inhibiting printing of the accepted print data different from the test chart until a user input is input in response to the notifying.

7. The method according to claim 6, further comprising notifying the user that the correcting of the sheet conveying distance has not been corrected by displaying a warning, wherein the printing apparatus includes an operation display panel unit for displaying the warning thereon.

8. The method according to claim 6, the printing apparatus inhibits printing of print data accepted in the accepting step until completion of the correcting of the sheet conveying distance of the sheet kind has been executed in the correcting step.

9. The method according to claim 6, further comprising inputting an adjustment value by a user, wherein the correction step corrects the sheet conveying distance based on the adjustment value input at the input step.

10. The method according to claim 6, further comprising detecting an adjustment value with an optical sensor, wherein the correction step corrects the sheet conveying distance based on the adjustment value detected by the detecting step.

11. A non-transitory computer-readable storage medium having stored thereon a program for causing a computer to execute a control method of a printing apparatus, the method comprising:

correcting a sheet conveying distance, for every sheet kind, of a sheet to be used for printing by the printing apparatus according to an adjustment value based on a test chart printed by the printing apparatus;

storing correction execution information which indicates whether the correcting of the sheet conveying distance by the correction unit is executed for every sheet kind;

accepting print data different from the test chart;

determining, in a case where the print data different from the test chart is accepted in the accepting step, whether the correcting of the sheet conveying distance in the correcting step for a sheet kind used in printing of the print data different from the test chart and accepted in the accepting step has been executed based on the correction execution information stored in the storing step;

notifying a user, in a case where it is determined in the determining step that no correction of the sheet conveying distance for the sheet kind has been executed, that the correcting of the sheet conveying distance has not been executed even though the print data has been accepted in the accepting step; and inhibiting printing of the accepted print data different from the test chart until a user input is input in response to the notifying.

12. The medium according to claim 11, further comprising notifying the user that the correcting of the sheet conveying distance has not been corrected by displaying a warning, wherein the printing apparatus includes an operation display panel unit for displaying the warning thereon.

13. The method according to claim 11, the printing apparatus inhibits printing of print data accepted in the accepting step until completion of the correcting of the sheet conveying distance of the sheet kind has been executed in the correcting step.

14. The method according to claim 11, further comprising inputting an adjustment value by a user, wherein the correction step corrects the sheet conveying distance based on the adjustment value input at the input step.

15. The method according to claim 11, further comprising detecting an adjustment value with an optical sensor, wherein the correction step corrects the sheet conveying distance based on the adjustment value detected by the detecting step.

* * * * *